United States Patent
Petrovic

(10) Patent No.: US 9,908,721 B2
(45) Date of Patent: Mar. 6, 2018

(54) PALLETIZER, PALLETIZING METHOD, AND TRANSFER OF A LAYER OF OBJECTS BY PALLETIZER FROM A CONVEYOR TO A LAYER DEPOSITING TOOL

(71) Applicant: SIDEL PARTICIPATIONS, Octeville-sur-Mer (FR)

(72) Inventor: Zmaj Petrovic, Octeville-sur-Mer (FR)

(73) Assignee: GEBO PACKAGING SOLUTIONS ITALY S.R.L., Parma (IT)

( * ) Notice: Subject to any disclaimer, the term of this patent is extended or adjusted under 35 U.S.C. 154(b) by 604 days.

(21) Appl. No.: 13/716,797

(22) Filed: Dec. 17, 2012

(65) Prior Publication Data
US 2013/0160403 A1 Jun. 27, 2013

(30) Foreign Application Priority Data
Dec. 22, 2011 (FR) .................................. 11 62306

(51) Int. Cl.
*B65G 57/24* (2006.01)
*B65B 35/00* (2006.01)

(52) U.S. Cl.
CPC .............. *B65G 57/24* (2013.01); *B65B 35/00* (2013.01)

(58) Field of Classification Search
CPC .......... B65B 35/50; B65B 35/52; B65G 57/24
USPC .................................................. 53/447, 540
See application file for complete search history.

(56) References Cited

U.S. PATENT DOCUMENTS

| 2,875,908 A | | 3/1959 | Woodcock et al. | |
| 3,471,038 A | * | 10/1969 | Verrinder | B65G 57/245 |
| | | | | 414/792.6 |
| 4,055,257 A | * | 10/1977 | Krebs | B65G 57/14 |
| | | | | 198/469.1 |
| 4,195,959 A | * | 4/1980 | Schmitt | B65G 57/035 |
| | | | | 414/788.9 |

(Continued)

FOREIGN PATENT DOCUMENTS

| EP | 0 007 119 A1 | 1/1980 |
| EP | 2 112 097 A1 | 10/2009 |
| FR | 2 554 094 A2 | 5/1985 |

OTHER PUBLICATIONS

French Search Report of FR 1162306, dated Aug. 14, 2012.
French Written Opinion of FR 1162306.

*Primary Examiner* — Robert Long
*Assistant Examiner* — Xavier A Madison
(74) *Attorney, Agent, or Firm* — Sughrue Mion, PLLC

(57) ABSTRACT

A palletizer for depositing a preformed layer (13) of objects (14) on a pallet (15). The palletizer includes a conveyor, equipped with an advancement mechanism (16, M1), which advances the preformed layer of objects and is designed to impart kinetic energy to the preformed layer (13) of objects, a layer depositing tool (12) designed to deposit the preformed layer (13) of objects onto the pallet (15), and a transfer mechanism for transferring the preformed layer (13) of objects and designed so that the entirety of the preformed layer (13) of objects leaves the conveyor and arrives on the layer depositing tool (12). The transfer mechanism includes the advancement mechanism (16, M1). The conveyor is a conveyor-launcher (11) designed for launching the preformed layers (13) of objects, and the transfer mechanism includes the advancement mechanism of the conveyor- (Continued)

launcher and the kinetic energy imparted by the conveyor-launcher (11).

21 Claims, 9 Drawing Sheets

(56) References Cited

U.S. PATENT DOCUMENTS

| | | | | |
|---|---|---|---|---|
| 4,205,934 A | * | 6/1980 | Pantin | B65G 57/24 |
| | | | | 414/793.5 |
| 4,274,780 A | | 6/1981 | Kaul et al. | |
| 4,439,084 A | * | 3/1984 | Werkheiser | 414/792 |
| 5,051,058 A | * | 9/1991 | Roth | B65G 57/035 |
| | | | | 414/676 |
| 5,271,709 A | * | 12/1993 | VanderMeer | B65G 47/088 |
| | | | | 198/419.1 |
| 5,567,113 A | * | 10/1996 | Mumper | B65G 57/035 |
| | | | | 414/791.6 |

\* cited by examiner

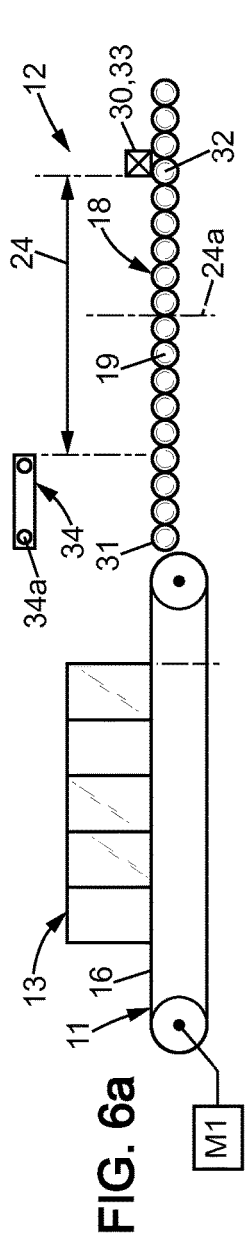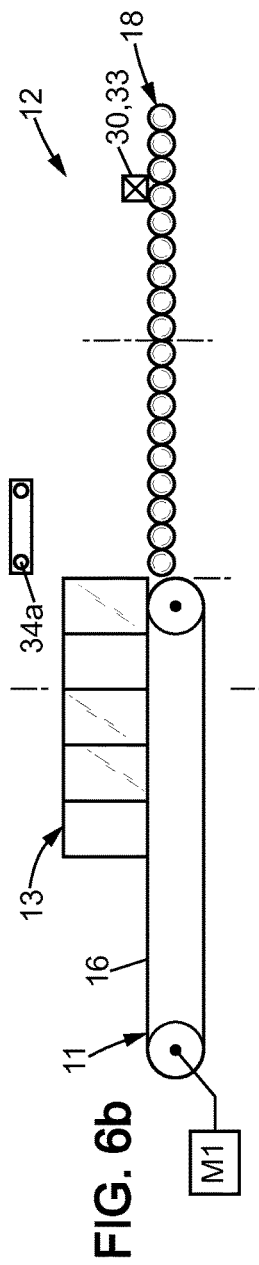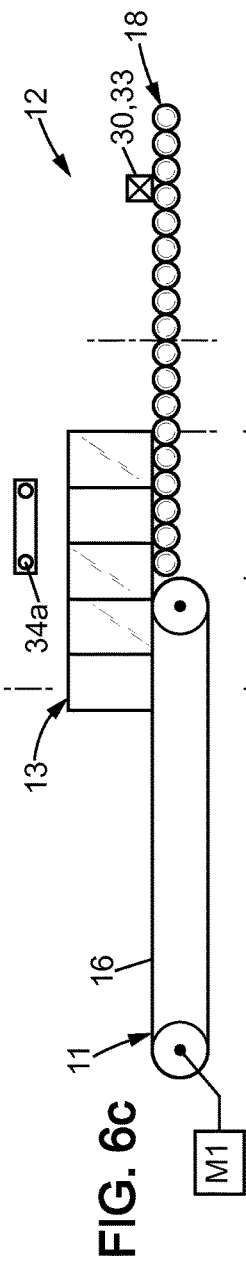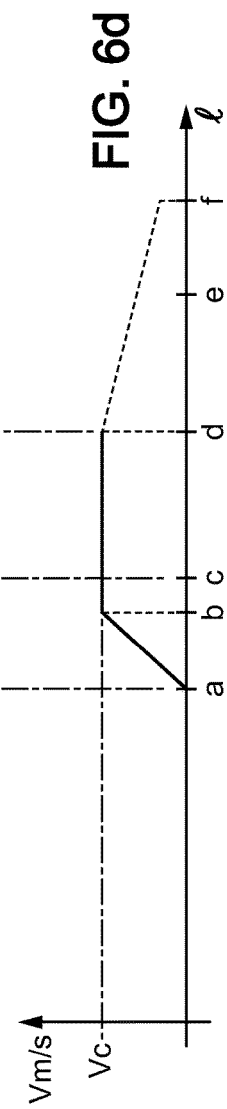

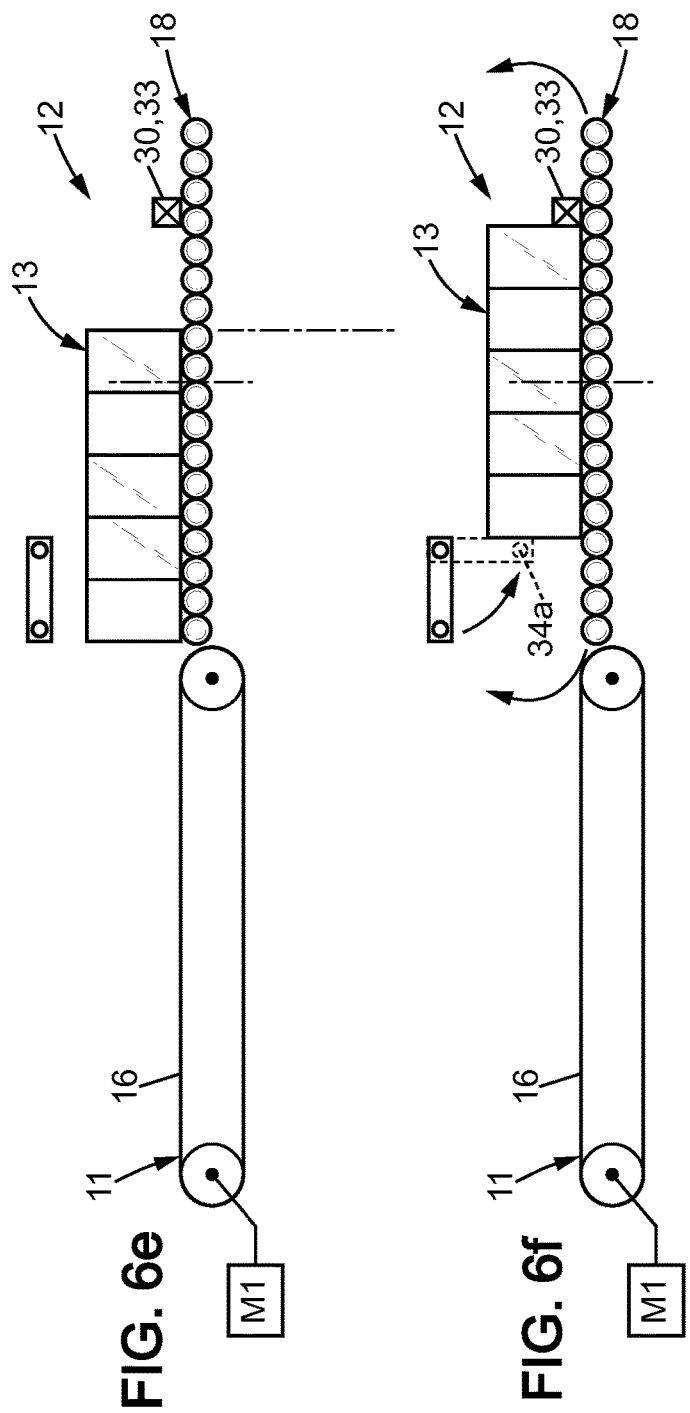
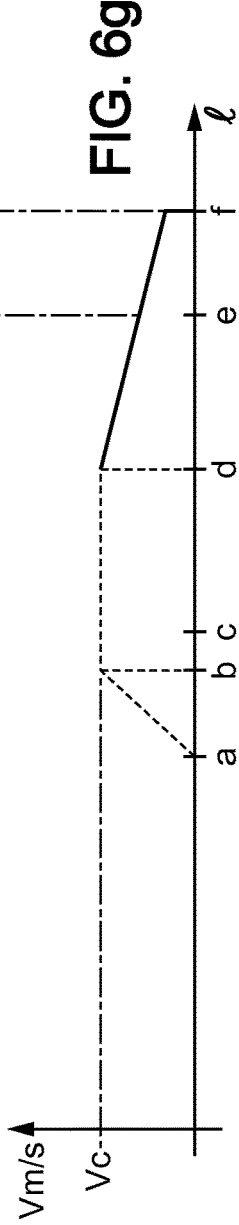
FIG. 6e  FIG. 6f  FIG. 6g

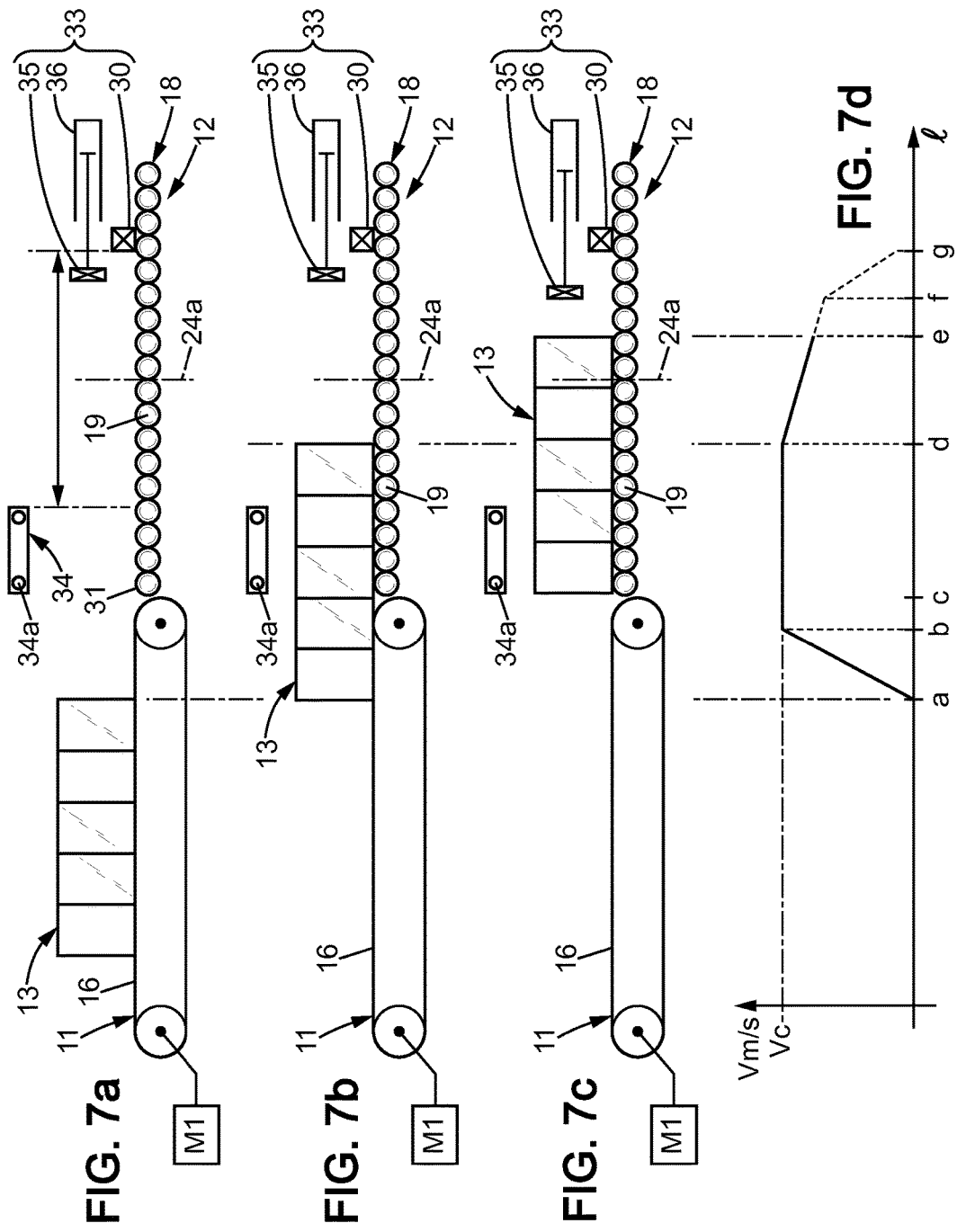

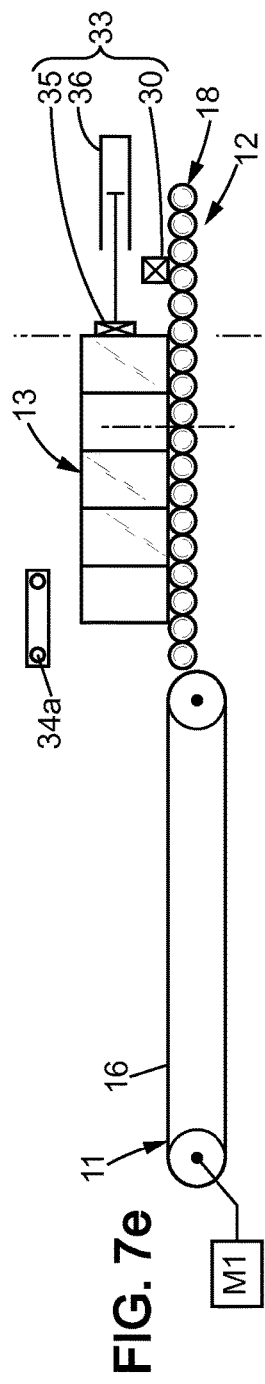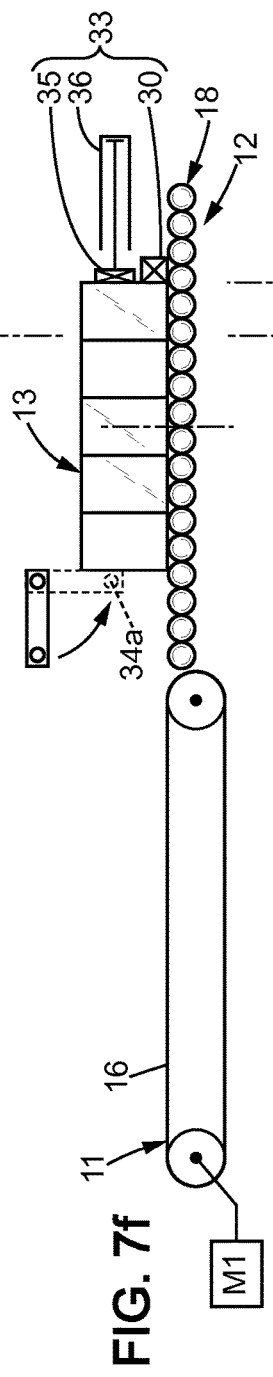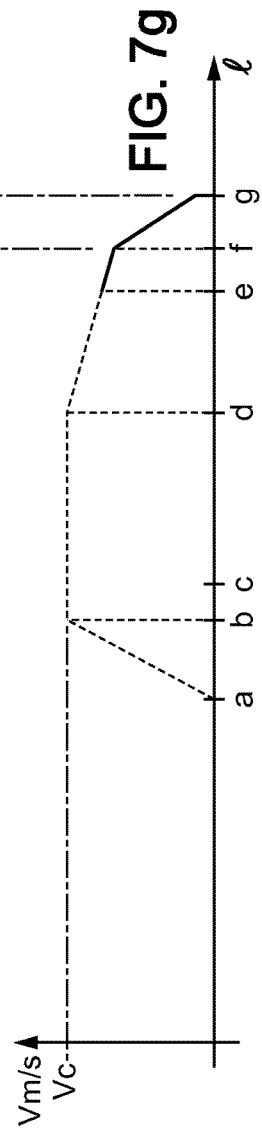

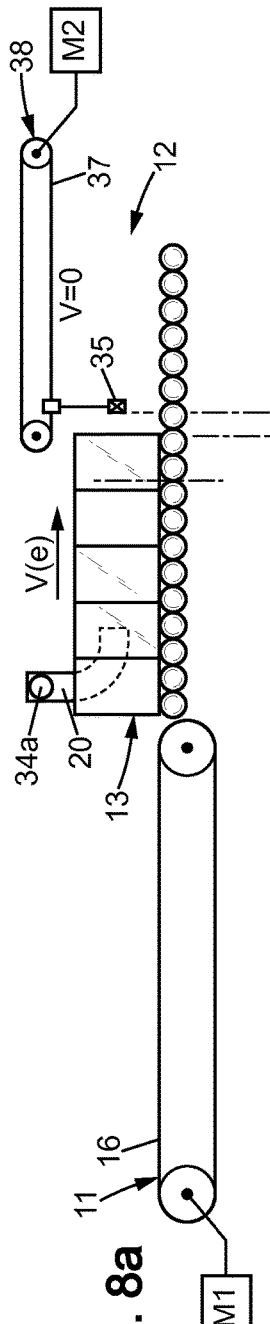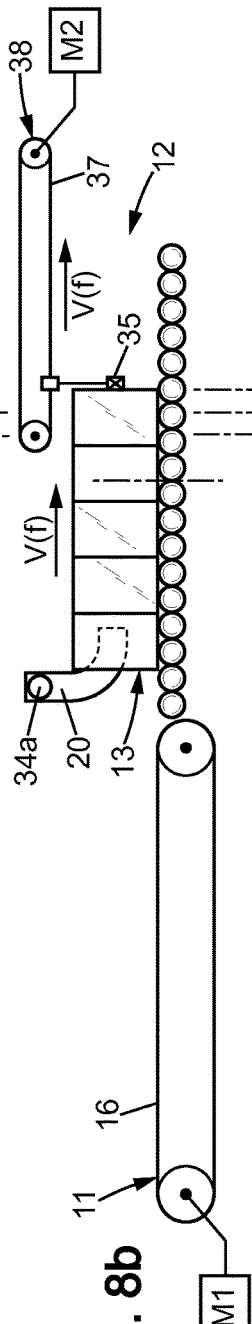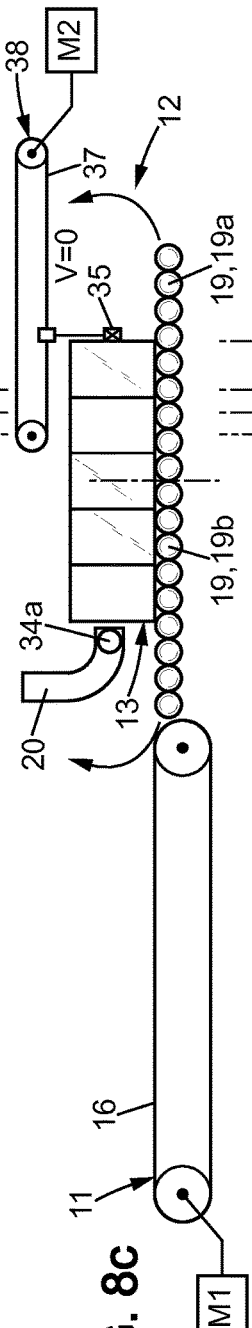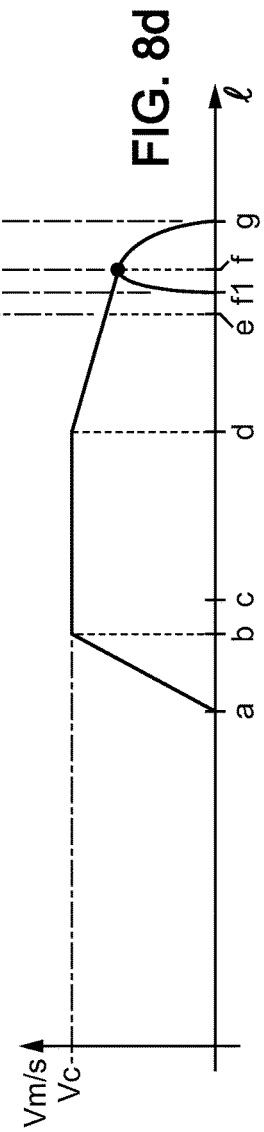

PALLETIZER, PALLETIZING METHOD, AND TRANSFER OF A LAYER OF OBJECTS BY PALLETIZER FROM A CONVEYOR TO A LAYER DEPOSITING TOOL

FIELD OF THE INVENTION

The invention relates to the field of palletizers and palletizing methods for depositing a preformed layer of objects on a pallet, particularly those which use a conveyor and a layer depositing tool.

The invention particularly relates to the phase of transferring the preformed layer of objects from the conveyor to the layer depositing tool.

RELATED ART

FIGS. 1a to 1c of the present patent application illustrate a palletizer according to the preamble of claim 1 and a palletizing method according to the preamble of claim 11.

The palletizer of FIGS. 1a to 1c comprises a conveyor 1 equipped with a motorized driving belt 2 and a layer depositing tool 3 that has a surface of freely rotating rollers 4 and is equipped with a transfer completion arm 5. The rollers 4 are for example mounted on bearings and are not driven by a motor. Some rollers 4a are rollers 4 which are not supporting objects and some rollers 4b have objects 6b rolling over them. When no object is rolling over them, the rollers 4a are stopped.

In a first advancement phase, a preformed layer 6 of objects 6a is advanced from a first initial position illustrated in FIG. 1a to an intermediate position illustrated in FIG. 1b. In this intermediate position, a part 6b of the preformed layer 6 of objects has already begun to be introduced onto the free rollers 4 and only one or a few objects 6a still remain on the motorized driving belt 2.

The arrival of objects 6b on the rollers 4b is accompanied by the indicated rollers 4b beginning to rotate. The inertia of these rollers 4b must be overcome in order for them to start to rotate. This consumes part of the kinetic energy of the objects 6b, which slows them down. In addition, the rotation of the rollers 4b is accompanied by friction in their bearings which also slows the objects 6b. The objects 6b are no longer advancing the way they were on the belt 2.

The advancement of the objects 6a is due to the friction coefficient from the objects on the belt 2. In the intermediate position, the object or the few objects still remaining on the belt 2 generate a forward thrust which may be insufficient to continue to push forward the other objects 6b already on the freely rotating rollers 4.

The transfer of the layer 6 onto the freely rotating rollers 4 is completed using a supplemental pushing means, illustrated as an arm 5 equipped with a pusher 7. In the prior art, the pusher 7 at least ensures the completion of the transfer of the preformed layer 6 of objects so that it finishes exiting the belt 2 of the conveyor 1.

In other words, the means of transferring the preformed layer of objects from the belt 2 to the layer depositing tool 3 comprises not only the motorization of the belt 2, but also the actuation of the arm 5.

Such a method of transferring the objects from the conveyor 1 to the layer depositing tool 3 has several disadvantages which contribute to a slow and costly transfer. Between the initial 1a and final 1c positions, the layer 6 of objects is advanced by several means 2 and 5. This involves high costs and necessitates synchronization of the various means. Such synchronization requires timing and synchronization means. In addition, the existence of the arm 5 and the pusher 7 can slow the palletizing method sequences that take place either before or after the transfer.

Patent EP 2 112097 also describes a palletizer according to the preamble of claim 1. In this palletizer, preformed layers of objects are transferred from a motorized conveyor to a loading station. The loading station is equipped with rollers which do not rotate freely because they are driven by a motor. The palletizer also comprises a securing arm analogous to the arm 5 of the prior art described above.

Because of the motorization of the rollers in the loading station, the objects arriving on these rollers are not slowed and do not exert forces opposing the arrival on the loading station of objects still on the conveyor. In other words, the means for transferring the entire preformed layer of objects from the conveyor to the loading station not only comprises the motorization of the conveyor but also the motorization of the rollers of the loading station, and also comprises the actuation of the securing arm.

Patent EP 0 007 119 describes a device for stacking objects. In this document, objects are progressively pushed onto a table to form rows. Then, the various rows are pushed against each other on a fork to form a layer of objects to be palletized. The layer is formed directly on the depositing fork. There is no transfer of a preformed layer of objects from a conveyor to a layer depositing tool. The disadvantage of this is that the layer depositing tool, which in this case is the fork, is immobilized for the entire duration of the formation of the layer to be palletized. The device described in that same document also comprises a path of feed rollers which may consist of motor-driven rollers followed by freely rotating rollers. However, the transfer of a given object from the motor-driven rollers to the freely moving rollers is only completed because the objects following the given object, and advanced by the motorized rollers, push this object off the motorized rollers. The document does not present a solution for finishing the transfer of a layer of objects off the motorized rollers.

Patent FR 2 554 094 describes the transfer of a package from upstream rollers to downstream rollers. The transfer of the package takes place in its entirety while both the upstream rollers and downstream rollers are being rotated by a belt.

OBJECT AND SUMMARY OF THE INVENTION

The invention proposes a palletizer and a palletizing method for depositing a performed layer of objects on a pallet which overcome at least one of the above disadvantages.

One goal of the invention is to propose a faster palletizing method and/or a less expensive palletizer.

In one embodiment, the palletizer for depositing a preformed layer of objects on a pallet comprises:
  a conveyor, equipped with an advancement means which advances the preformed layer of objects, and designed to impart kinetic energy to said preformed layer of objects,
  a layer depositing tool, designed to deposit the preformed layer of objects on the pallet, and
  a transfer means for transferring the preformed layer of objects from the conveyor to the layer depositing tool.

The transfer means comprises said advancement means as well as a transfer completion means designed so that the entirety of the preformed layer of objects leaves the conveyor and arrives on the layer depositing tool. The conveyor acts as a "launcher" for the preformed layers of objects. The transfer completion means consists exclusively of the kinetic energy imparted by the conveyor-launcher.

In the case where the advancement means of the conveyor is unable to give to the layer sufficient forward thrust to force the layer to leave the conveyor completely, it is understood that the kinetic energy imparted to this layer can still allow the layer of objects to continue its motion beyond the position where the forward thrust alone would be insufficient.

Thus, the kinetic energy, or the amount of movement, stored by the preformed layer of objects during its launch by the conveyor constitutes a transfer completion means which allows completing the transfer of the entire preformed layer of objects onto the layer depositing tool. Such a transfer completion means offers the advantage of automatically taking over the advancement means of the conveyor without requiring a slow and costly synchronization. In other words, by consisting solely of the stored kinetic energy and the positive advancement provided by the conveyor, the means for transferring the entire preformed layer of objects to the layer depositing tool is particularly fast and inexpensive.

Advantageously, the layer depositing tool is equipped with a receiving bed consisting of a plurality of rotatable rollers. In particular, the rollers of the receiving bed can rotate freely and are not motorized. The bed provides a target surface on which a preformed layer of objects is ready to be deposited on the pallet, and a first roller which is intended to be substantially adjacent to the conveyor.

In one embodiment, the palletizer comprises a transfer completion means that brings the layer all the way onto the target surface. The transfer completion means consists exclusively of the kinetic energy imparted by the conveyor-launcher. This reduces the number of mechanisms that must be assembled onto the layer depositing tool. This lightens the layer depositing tool. It allows accelerating the phases of the palletizing method which involve movement of the layer depositing tool. This allows reduction of the energy consumption of the palletizer.

In one embodiment, the palletizer comprises a means of stopping the preformed layer of objects on the target surface.

In a variant, said stopping means consists of a stop which remains immobile during the transfer of the preformed layer of objects. Said stop is placed at or near the end of the target surface furthest from the conveyor-launcher. This variant is particularly appropriate for objects having a fairly high natural deceleration on freely turning rollers. Such is the case with film-packed petaloid-type bottles.

In a variant, the palletizer comprises a means for rapidly braking the preformed layer of objects, said means comprising a stop, assembled onto a shock absorber and moving at least between a rapid braking start position and a position at or near the end of the target surface furthest from the conveyor-launcher. This variant is particularly appropriate for objects that slide easily on the surface of the freely turning rollers. Such is the case for packs with flat cardboard bottoms. This variant can also be very useful for fragile (glass bottles) or unstable (tall bottles) objects to be palletized.

Advantageously, the rollers of the layer depositing tool are not connected to a positive drive means and/or are only rotated by the friction of objects being transferred. The layer depositing tool can advantageously be without a means for advancing the preformed layer of objects in the transfer direction. This lightens the layer depositing tool and reduces the palletization cycle time and energy consumed, as explained above.

Advantageously, the palletizer is in a transfer configuration in which the receiving bed is coplanar to the plane of conveyance of the conveyor-launcher.

Advantageously, the advancement means of the conveyor is equipped with an advancement support and a motor for supplying motion to the advancement support. The advancement support is designed to impart kinetic energy to said layer of objects by the friction of the objects on the advancement support due to the effect of the weight of the objects.

Advantageously, the material of the advancement support is adapted to the type of base of the objects to be palletized. This allows determining the maximum acceleration that can be applied to the preformed layer of objects. This maximum acceleration can be taken into account in an automatic determination of the velocity profile to be applied to the layer of objects by the conveyor.

Also, the conveyor may comprise a slide plane and a pusher designed to push the preformed layer of objects directly towards the layer depositing tool. However, said pusher does not penetrate within the layer depositing tool and/or does not extend above said plurality of rollers.

In another aspect, the invention relates to a method for palletizing a preformed layer of objects on a pallet, using a conveyor and a layer depositing tool. The method comprises a transfer step, during which the preformed layer of objects is advanced, in a transfer direction, from the conveyor to the layer depositing tool. The transfer step comprises a transfer completion phase, during which the entirety of said preformed layer of objects leaves the conveyor and arrives on the layer depositing tool. The transfer step comprises a launch phase for the preformed layer of objects, during which the conveyor imparts kinetic energy to said preformed layer of objects. The advancement of said preformed layer of objects in the transfer direction during the transfer completion phase is solely due to the kinetic energy acquired during the launch phase.

As was explained for the palletizer, one can see that such a transfer step is quite rapid because the transfer completion phase begins automatically at the end of the launch phase without requiring any means of synchronization.

Advantageously, the layer depositing tool that is used provides a target surface on which the preformed layer of objects is ready to be deposited on the pallet, the kinetic energy imparted during the launch step being sufficient for the entirety of the preformed layer of objects to arrive on the target surface.

Advantageously, the kinetic energy imparted by the conveyor to said preformed layer of objects is greater than or equal to the energy consumed during the movement of the preformed layer of objects onto the layer depositing tool.

Advantageously, when the layer depositing tool used comprises a plurality of rotatable rollers, the kinetic energy imparted to the layer by the conveyor is greater than the kinetic energy imparted to the rollers by the layer.

For a given layer of objects, a given inertia of the rollers, and given conditions of cooperation between the bottom of the objects and the surface of the rollers, one can determine the natural deceleration of the preformed layer of objects on the rollers, as well as the kinetic energy that must be imparted during the launch phase. This allows determining the control parameters for the conveyor-launcher. In other words, the corresponding palletizer comprises a means for determining the kinetic energy that must be imparted by the conveyor-launcher to the preformed layer of objects in order to enable the entirety of the preformed layer of objects to leave the conveyor and arrive on the layer depositing tool.

In one embodiment, the method comprises a phase of rapid deceleration of the objects on the tool, during which the objects are decelerated with a deceleration intensity that is higher than a threshold referred to as the natural deceleration.

Figure 1A:
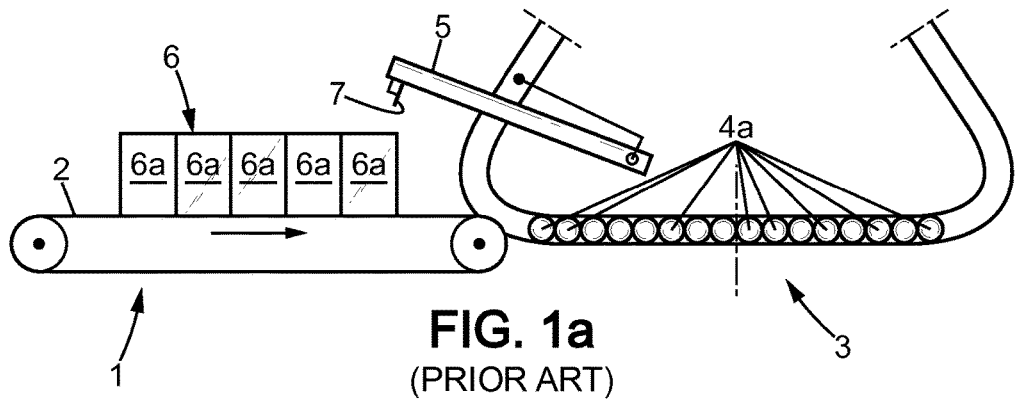
FIGS. 1a, 1b, 1c respectively illustrate an initial configuration, an intermediate configuration, and a final configuration of a transfer step according to a prior art palletizer.
Figure 1B:
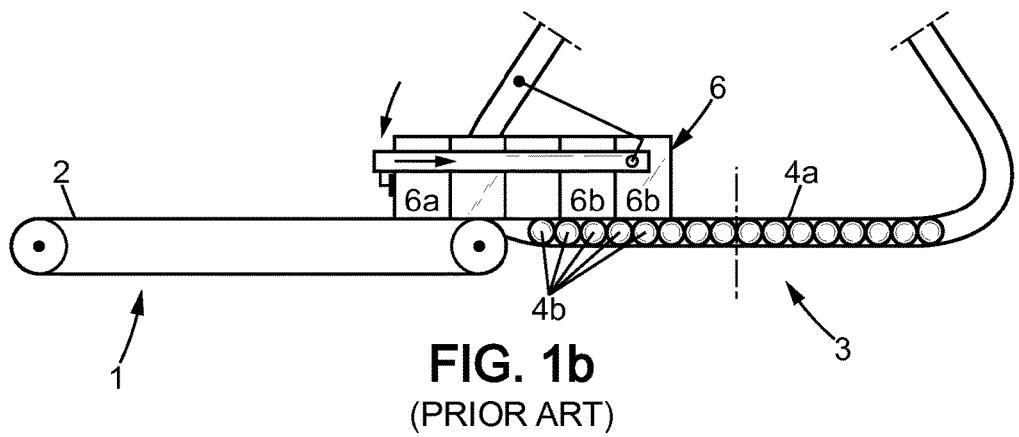
Figure 1C:
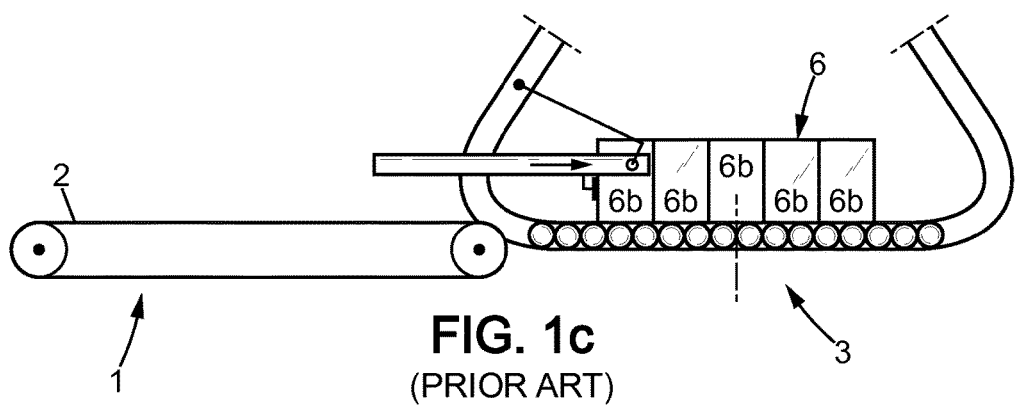
Figure 2:
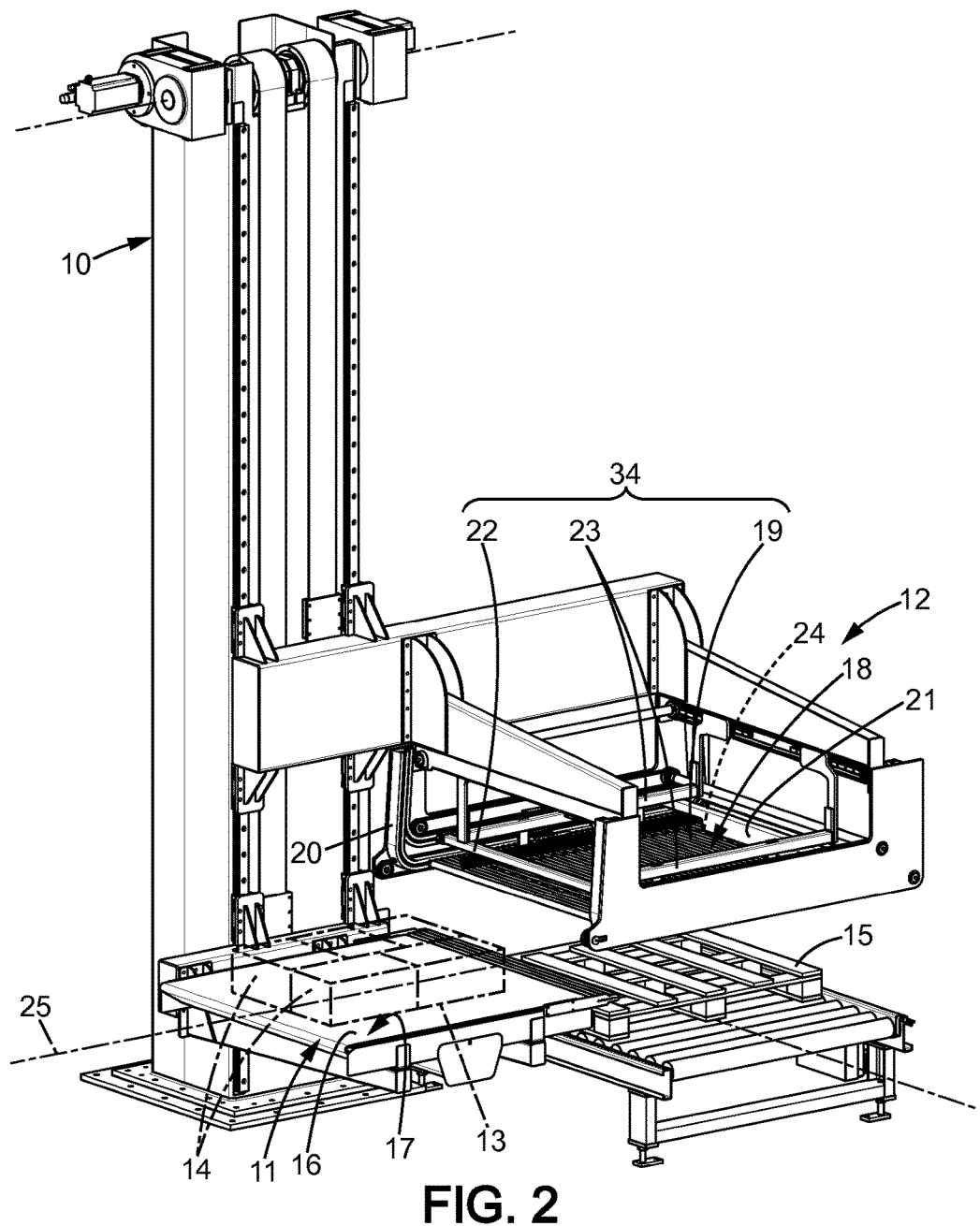
Figure 3:
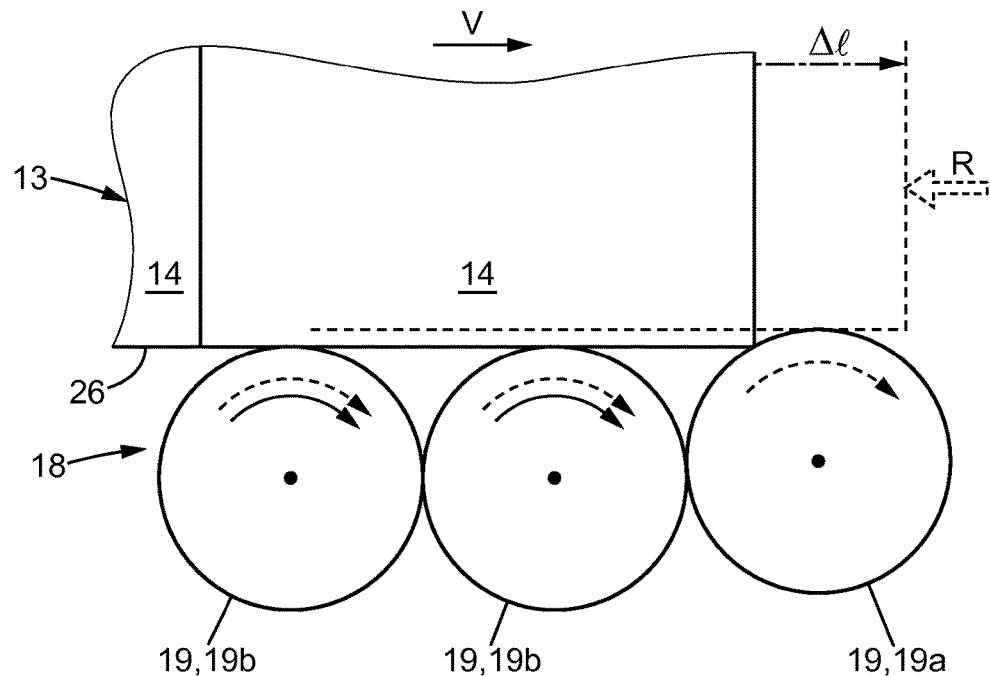
Figure 4:
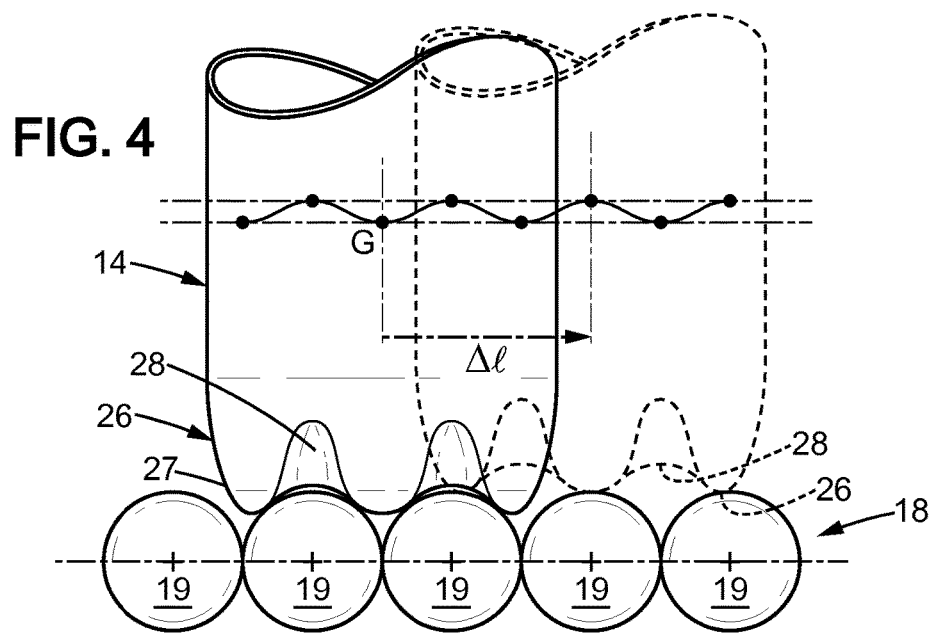
Figure 5A:
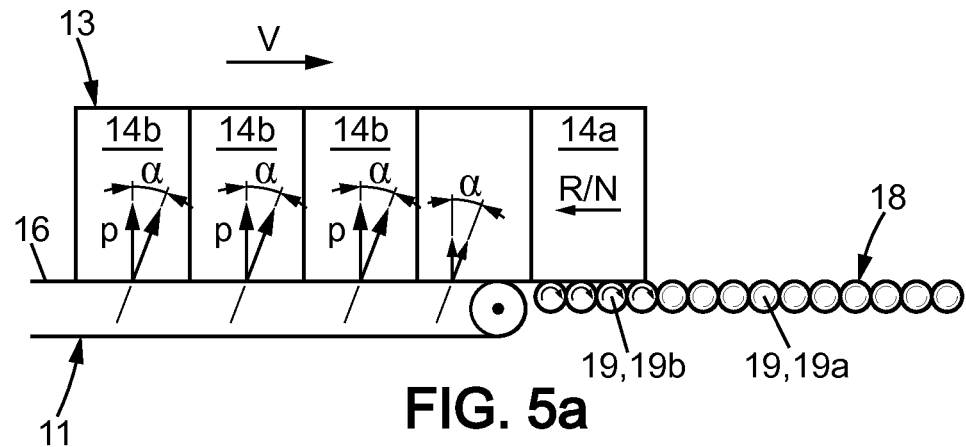
Figure 5B:
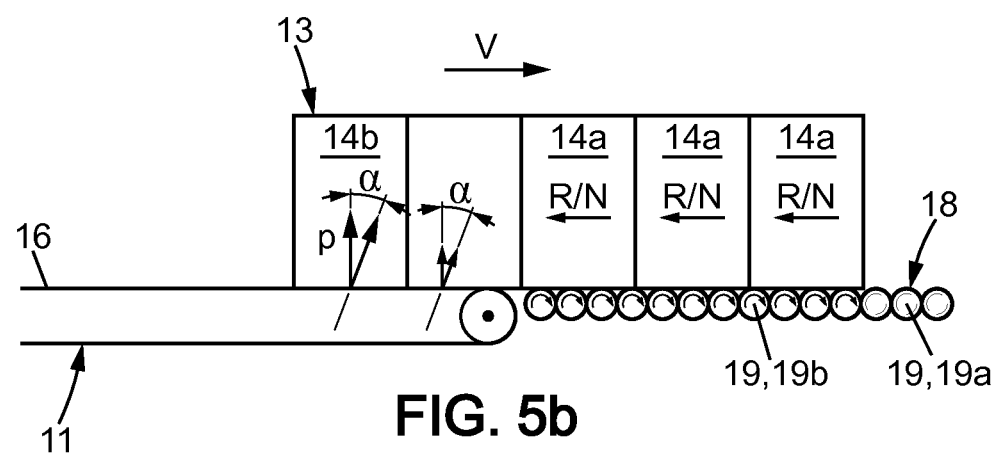

The invention will be better understood by examining a detailed description of several embodiments provided as non-limiting examples and illustrated by the attached drawings, in which:

FIG. 2 illustrates an embodiment of the invention;

FIG. 3 illustrates a first cause of natural slowing of a layer of objects along a surface of freely rotating rollers;

FIG. 4 illustrates a second cause of natural slowing of a preformed layer of objects along a surface of freely rotating rollers;

FIGS. 5a and 5b illustrate the problem posed by completing the transfer of the preformed layer of objects onto the surface of the rollers;

FIGS. 6a to 6g illustrate different steps in the transfer, and a diagram of the velocities according to another embodiment;

FIGS. 7a to 7g illustrate different steps in the transfer, and a diagram of the velocities according to another embodiment;

FIGS. 8a to 8d illustrate different steps in the transfer, and a diagram of the velocities according to the embodiment in FIG. 2.

DETAILED DESCRIPTION

As illustrated in FIG. 2, the palletizer comprises a column 10 attached to the ground, on which a conveyor 11 and a layer depositing tool 12 slide vertically. Represented with dotted lines on the conveyor 11 is a layer 13 of objects 14 which have been previously assembled into the layer 13 by a layer preparation device which is not illustrated in these FIGURES. The objects 14 are, for example, packs of six bottles or any number of cans or parallelepiped cardboard containers. The pack is shrink-wrapped together in a film which gives it and maintains an external shape that is substantially parallelepiped. The layer 13 preparation device orients the objects 14 so that the layer 13 is compact and substantially covers the entire surface of a pallet 15. The layer depositing tool 12 is arranged above the pallet 15 and rises as the various layers 13 are stacked onto the pallet 15. The conveyor 11 primarily acts as a vertical shuttle between the layer preparation device and the layer depositing tool 12.

The conveyor 11 comprises an advancement support 16 in the form of a conveyor belt driven by a motor M1 illustrated in FIGS. 6 to 8. The advancement support 16 moves along a plane of conveyance 17 and in a transfer direction 25. The layer depositing tool 12 is equipped with a receiving bed 18 consisting of a plurality of rollers 19 that rotate freely and are attached together by two end chains which slide in tracks 20 in a manner that opens the receiving bed 18 in the middle to allow depositing the preformed layer 13 of objects on top of the pallet 15.

The palletizer 1 comprises a transfer configuration, which is not the one illustrated in FIG. 2, during which the plane of conveyance 17 of the conveyor 11 is brought into alignment with the receiving bed 18 of the layer depositing tool 12.

The layer depositing tool 12 additionally comprises a retaining means 34 comprising a downstream stop 21 on the downstream end and a retaining bar 22 on the upstream end. Their functions will be described in more detail below. The retaining means 34 additionally comprises side retaining bars 23. When the preformed layer 13 of objects is ready to be deposited on the pallet 15, the downstream stop 21 and the retaining bars 22 and 23 delimit a target surface 24 that is in alignment with the stack of preformed layers 13 of objects already deposited on the pallet 15. Thus, during the retraction of the rollers 19 along the tracks 20, the preformed layer 13 of objects remains in place due to the downstream stop 21 and the retaining bars 22, 23, so that the layer 13 is deposited exactly above the previous one.

The rollers 19 of the receiving bed 18 can each rotate freely and are substantially coplanar. Each of the rollers 19 is substantially adjacent to the neighboring roller 19. Each of the rollers 19 extends across the entire width of the receiving bed 18 in a direction perpendicular to the transfer direction 25, for a length that is greater than the target surface 24, for example greater than 1.3 meters. The rollers 19 are relatively small in diameter, for example 30 to 40 mm, and in particular about 35 mm in diameter. Thus the receiving bed 18 consists of rollers 19 that are both long and of small diameter.

The movement of the preformed layer 13 of objects in the transfer direction 25, from the conveyor 11 to the target surface 24, is only due to the kinetic energy imparted to the preformed layer 13 of objects by the conveyor 11. In other words, the conveyor 11 is a conveyor-launcher which launches the preformed layer 13 of objects with sufficient velocity for it to reach the target surface 24 of the layer depositing tool 12 without requiring drive means for the rollers 19, said rollers only being rotated by the friction of the objects 14 in the preformed layer 13 of objects as they arrive at high speed on the receiving bed 18.

Next, a few causes of resistance to the sliding of the preformed layer 13 of objects along the receiving bed 18 will be described, with references to FIGS. 3 and 4. As illustrated in FIG. 3, the rollers 19 of the layer depositing tool 12 bend under the weight of the preformed layer 13 of objects. Thus, a roller 19a which has not yet been reached by the preformed layer 13 of objects may be slightly above the rollers 19b already supporting said layer 13. A difference in height between the rollers 19a and 19b may also result from allowable mechanical variations in the rollers 19.

When the preformed layer 13 of objects slides with a certain velocity "V" along the receiving bed 18, friction from the bottom 26 of the objects 14 causes the rollers 19b on which they rest to rotate. This is illustrated by the solid arrows in FIG. 3. The energy consumed as the preformed layer 13 of objects advances by a distance $\Delta \ell$, from the position illustrated with solid lines to the one illustrated with dotted lines, corresponds to the sum of the energy necessary to raise the preformed layer 13 of objects above the roller 19a and/or to bend this roller 19a, the energy necessary to cause the roller 19a to rotate at the same speed as the other rollers 19b, and the energy necessary to overcome any friction due to the rotation of the rollers 19a and 19b. All these energies dissipate and/or are stored in the receiving bed 18.

FIG. 4 illustrates another cause of energy consumption. Energy is dissipated in the preformed layer 13 of objects due to the fact that this layer is not infinitely rigid and/or elastic.

Take the example where the objects 14 in said layer 13 are packs of six bottles shrink-wrapped together with film, each of the bottles having a petaloid base 26, forming bumps 27 that project 27 from a rounded wall 28. This type of bottle is commonly used for sparkling mineral water. It is common for packs of petaloid bottles to rest directly on the bumps 27 on the bottle base. The angular position of the bumps of bottles in the same pack 14 relative to each other generally remains random.

If a bottle moves horizontally by itself along the receiving bed 18, its center of gravity G is subject to periodic vertical oscillations due to the varying correspondence of the bumps 27 and of the vertical distance between the lowermost points of the bumps 27 and the rounded wall 28, to the space between two successive rollers 19. The amplitude and phase of these vertical oscillations vary with the angular orientation of the bumps 27 relative to the axis of rotation of the rollers 19. As the bottles are not free but are contained within a pack, and the different packs in the preformed layer 13 of objects are pressing against one another, the stresses that would cause vertical oscillations in a single bottle are expressed as internal stresses within the pack 14, or even relative sliding between bottles and/or packs 14 and possibly even deformations in the bottles. All such stresses and/or sliding and/or deformations affect materials that are not completely elastic. Thus the periodic stresses caused by the sliding of the bumps 27 on and between the rollers 19 are expressed as a dissipation of energy, primarily in the preformed layer 13 of objects. The inventor realized that, for a given dimension of the rollers 19 and for given dimensions of the base 26 of the bottles, this type of energy consumption is reduced more as the transfer speed of the preformed layer 13 of objects increases. In effect, at high speeds, the bases 26 of the bottles do not have time to slide into the spaces between the rollers 19.

The sum of the energies consumed by the receiving bed 18 or by the preformed layer 13 of objects, during their advancement $\Delta \ell$ along the receiving bed 18, is expressed as an advancement resistance "R", equal to the sum of the energies consumed divided by the distance $\Delta \ell$.

The inventor realized that it is difficult or even impossible for a rotating belt type of advancement support 16 of a conveyor to push the entirety of the preformed layer 13 of objects off the conveyor, unless it has imparted a sufficient velocity "V" to this preformed layer 13 of objects.

As illustrated in FIG. 5a, each of the objects 14 in the preformed layer 13 of objects has a friction coefficient relative to the advancement support 16 of the conveyor 11. In other words, for a given weight "P" for the object 14, the maximum tangential force that the advancement support 16 can exert on each object 14 is P·tan($\alpha$). If "N" is the total number of objects 14 in the preformed layer 13 of objects, this layer has an interim configuration illustrated in FIG. 5b in which "n" objects 14a have already traveled onto the receiving bed 18 of the layer depositing tool 12, while N-n objects 14b are still on the advancement support 16 of the conveyor 11. Due to energy consumption, each object 14a that has already traveled onwards is exposed to a force equal to R/N, where R is the advancement resistance that the set of N objects 14 in the layer 13 is subject to.

The inventor realized that, for a low transfer speed, there exists a maximum proportion (n/N<1) of objects 14a that can be pushed off the advancement support 16 by frictional force alone. The more that "n" increases, the greater the advancement resistance exerted by the receiving bed 18 on the preformed layer 13 of objects, until the tangential force exerted by the advancement support 16 reaches its maximum value for the remaining N-n objects 14b. From that point on, the advancement support 16 slides under the objects 14b which then no longer move. This intermediate configuration will be referred to as a loss-of-adhesion configuration.

The inventor realized that by launching the preformed layer 13 of objects with sufficient velocity before it reaches the loss-of-adhesion configuration, it is possible to guarantee the arrival of the entirety of the preformed layer 13 of objects on the layer depositing tool 12. In other words, the inventor realized that it is possible to complete the arrival of the entire preformed layer 13 of objects on the layer depositing tool 12, solely by means of the kinetic energy imparted by the advancement support 16, in a launch phase before the loss of adhesion.

A means of determining the kinetic energy to be imparted by the conveyor 11 to the preformed layer of objects can consist of a table of data stored in memory and of a means for determining one or more characteristics of the layer arriving on the conveyor 11. These layer characteristics may be the weight, the dimensions, the number of objects in the layer, and in particular, the type of base of the objects or of the layer that will be in sliding contact with the layer depositing tool. The table comprises data associated with these layer characteristics, indicating the minimum advancement velocity to be imparted to the layer in question so that it reaches the target surface of the layer depositing tool solely due to the momentum imparted by the conveyor 11. The means of determining the characteristics of the layer that has just arrived on the conveyor 11 may comprise a simple bar code reader. The determination of the minimum velocity to be imparted can result from a mathematical calculation or be determined empirically.

In one variant, the means of determining the kinetic energy to be imparted to the preformed layer of objects by the conveyor 11 can simply consist of the above table and a user interface for entering the velocity at which the layer is to be launched. An operator identifies the layer arriving on the conveyor, reads the corresponding launch velocity from the table, and enters the launch velocity setting for the layer.

In the embodiment illustrated in FIGS. 6a to 6g, the palletizer comprises a stop means 33 for said layer 13, consisting of a downstream stop 30 located downstream which is fixed relative to the end of the target surface 24 furthest from the conveyor 11. The receiving bed 18 of the layer depositing tool 12 comprises a first roller 31 which is substantially adjacent to the conveyor 11, and a downstream roller 32 located at the end of the target surface 24. The downstream stop 30 is adjustable so that it can accommodate the different formats of preformed layers 13 of objects that the palletizer is capable of processing. Once the position of the target surface 24 is determined for a given format, the downstream stop 30 is fixed in place and remains unmoving at least during the transfer of the preformed layer 13 of objects. The holding means 34, which keeps the preformed layer 13 of objects in place on the target surface 24, comprises a bar 34a which can moves between a retracted position above the top of the preformed layer 13 of objects where it allows the objects to pass, and a retaining position indicated with a dotted line in FIG. 6f.

The palletizing method comprises a step of transferring the preformed layer 13 of objects from the conveyor 11 to the layer depositing tool 12, illustrated by the succession of FIGS. 6a, 6b, 6c, 6e, 6f and by the corresponding graphs 6d, 6g indicating the velocities V. This transfer step comprises a launch phase illustrated in FIGS. 6a to 6c. There is first an acceleration phase (a-b), during which the preformed layer 13 of objects is still completely (or primarily) on the advancement support 16, such that the maximum tangential force can be exerted on each of the objects 14 (or of most of them) in order to accelerate. In this manner, one obtains a cruising speed "Vc" at position "b" well before the preformed layer 13 of objects reaches the loss-of-adhesion position "d". The faster the cruising speed "Vc" is achieved, the faster the transfer. The acceleration imparted by the advancement support 16 is limited, however, to avoid causing the layer 13 to slide on the advancement support. 16. This can allow using the conveyor 11 to determine the position of said layer 13 and thus synchronizing the actions of the various elements of the palletizer. The acceleration can also be limited if there is a chance of the objects 14 tipping over.

The advancement support 16 is set in motion by a motor M1 of sufficient power so that, for a given set of uses of the palletizer, the acceleration of the advancement support 16 is limited by the type of use and not by the capacity of the motor.

Preferably, the launch start position illustrated in FIG. 6a is determined such that the cruising speed Vc is reached slightly before position "c" where the preformed layer 13 of objects begins to enter the layer depositing tool 12. In this manner, the energy consumed by objects 14b such as petaloid bottles is reduced. This allows reducing the transfer time.

The transfer step additionally comprises a transfer completion step (d-e), extending between the loss-of-adhesion position "d" and the position "e", illustrated in FIG. 6d, in which the entirety of the preformed layer 13 of objects has arrived on the layer depositing tool 12.

The transfer step additionally comprises an end travel phase, lasting until position "f" where the preformed layer 13 of objects has arrived on the target surface 24. In the embodiment illustrated in FIGS. 6a to 6g, the preformed layer 13 of objects undergoes a natural deceleration during the transfer completion and end travel phases. This deceleration may possibly be linear for objects 14 with a flat base and in which the main energy consumption resulting in advancement resistance is due to the successive rotation of the rollers 19. To be certain that the target surface 24 will be reached, it is arranged so that the velocity of the preformed layer 13 of objects is non-zero at the end of the end travel phase. The downstream stop 30 then serves to abruptly stop the preformed layer 13 of objects. In this embodiment, the cruising speed Vc is determined so that the residual velocity to which the downstream stop 30 is exposed is low enough for the objects 14 not to rebound.

The retaining bar 34a is then lowered into the retaining position illustrated with dotted lines in FIG. 6f, simultaneously with or slightly after the arrival of the preformed layer 13 of objects on the target surface 24. The retaining bar 34a can contribute to preventing the objects 14 from rebounding from the downstream stop 30.

The palletizer illustrated in FIGS. 7a to 7g only differs from the palletizer described above in that the stop means 33 comprises, in addition to the fixed downstream stop 30, a movable stop 35 mounted on a shock absorber 36. The launch phase (a-b-c-d) is similar to the one described above aside from the cruising speed Vc being much higher. The transfer completion phase (d-e) occurs at a natural deceleration rhythm, as described above. The end travel phase (e-f-g) comprises, slightly after the position "e" where the objects have been completely transferred onto the layer depositing tool 12, a phase (f-g) of rapid deceleration which is faster than the natural deceleration. In position "f" where the rapid deceleration begins, the movable stop 35 and the shock absorber 36 begin controlling the movement of the preformed layer 13 of objects. The fixed downstream stop 30 ensures the accuracy of the final position "g" of the preformed layer 13 of objects on the target surface 24.

The palletizer illustrated in FIGS. 8a to 8d corresponds to FIG. 2, and only differs from the palletizer illustrated in FIGS. 7a to 7g by the mode for guiding the upstream retaining bar 34a and by a mechanism which constitutes both a shock absorber and a stop means. There is no downstream stop 30 that is mechanically fixed in place. The mechanism 38 comprises the movable stop 35, which is a bar driven at each end by a belt 37 powered by a motor M2. Controlling the motor M2 gives control of the position, velocity, and deceleration of the movable stop 35. In particular, it is possible to control the motor M2 so that the movable stop 35 is maintained at the end position "f", with the motor M2 then guaranteeing sufficient force for maintaining at this fixed position "g".

Optionally, it is possible to bring the movable stop 35 to a position "f1" before the position "f" where the rapid slowing begins. While the preformed layer 13 of objects is traveling distance (d-e), the motor M2 starts moving the movable stop 35 at a slower velocity than the preformed layer 13 of objects, so that the movable stop 35 and the preformed layer 13 of objects meet at position "f" at a substantially identical velocity. This prevents any impact between the preformed layer 13 of objects and the movable stop 35 when the rapid braking begins. This variant is particularly useful for objects 14 which are fragile or unstable. During the rapid deceleration phase (f-g), said layer 13 pushes against the movable stop 35 and the motor M2 supplies resistance. Advantageously, the motor M2 can be controlled so that, regardless of allowable mechanical variations and the actual velocity at which the preformed layer 13 of objects arrives, it is brought to a velocity that is substantially zero at the end position "g".

In another variant, the belt arrangement 37 is longer than illustrated in FIGS. 8a to 8d, and allows the movable stop 35 to be responsible for slowing the preformed layer 13 of objects starting from the transfer completion position "d" or even from the loss of adhesion position "c". This variant provides better control of the exact position of the preformed layer 13 of objects during the transfer. This allows implementing a velocity diagram that is independent of the randomness that may affect the natural deceleration of said layer 13.

The invention claimed is:

1. A palletizer for depositing a preformed layer of objects on a pallet, comprising:
   a conveyor driven by a first motor for advancing the preformed layer of objects while the objects are on the conveyor so as to impart kinetic energy to said preformed layer of objects; and
   a layer depositing tool, designed to deposit the preformed layer of objects onto the pallet; and
   a movable stop controlled by a second motor;
   wherein the conveyor is controlled to advance the preformed layer of objects by launching the preformed layers of objects so that the entirety of the preformed layer of objects leaves the conveyor and arrives on the layer depositing tool; and
   wherein the movable stop controlled by the second motor resists movement of the preformed layer arriving on the layer depositing tool so as to slow down to a stop the movement of the preformed layer while the movable stop moves in a same direction of the preformed layer as the preformed layer arrives on the layer depositing tool, and stopping the preformed layer at a predetermined end position.

2. The palletizer according to claim 1, comprising a means of determining said kinetic energy to be imparted.

3. The palletizer according to claim 1, wherein the layer depositing tool is without a mechanism for advancing the preformed layer of objects in the transfer direction.

4. The palletizer according to claim 1, wherein the layer depositing tool is equipped with a receiving bed comprising a plurality of rotatable rollers, said bed providing a target surface on which a preformed layer of objects is ready to be deposited on the pallet, and a first roller which is intended to be substantially adjacent to the conveyor.

5. The palletizer according to claim 4, comprising a transfer completion phase during which the preformed layers of objects are brought onto the target surface, said transfer completion phase involving the kinetic energy imparted by the conveyor.

6. The palletizer according to claim 4, wherein the rollers of the layer depositing tool are not connected to a drive mechanism.

7. The palletizer according to claim 4, wherein the rollers of the layer depositing tool are only rotated by the friction of objects being transferred.

8. The palletizer according to claim 4, presenting a transfer configuration in which the receiving bed is coplanar to a plane of conveyance of the conveyor.

9. The palletizer according to claim 1, wherein the conveyor imparts kinetic energy to said preformed layer of objects by the friction of the preformed layer of objects on the conveyor due to the effect of the weight of the preformed layer of objects.

10. The palletizer according to claim 1, wherein the second motor provides control of a position, velocity, and deceleration of the movable stop.

11. The palletizer according to claim 1, wherein the conveyor is controlled to advance the preformed layer of the objects by launching the preformed layers of objects so that the entirety of the preformed layer of objects leaves the conveyor and arrives on the layer depositing due solely to the kinetic energy imparted by the conveyor.

12. The palletizer according to claim 1, wherein the conveyor is supported to be movable in a vertical direction relative to a support structure for the conveyor.

13. A method for palletizing a preformed layer of objects on a pallet, using a conveyor and a layer depositing tool, said method comprising a transfer step during which the preformed layer of objects is advanced in a transfer direction, from the conveyor to the layer depositing tool, said transfer step comprising a transfer completion phase during which the entirety of said preformed layer of objects leaves the conveyor and arrives on the layer depositing tool, wherein the transfer step comprises a launch phase for the preformed layer of objects during which the conveyor imparts kinetic energy to said preformed layer of objects, the advancement of said preformed layer of objects in the transfer direction during the transfer completion phase being due to the kinetic energy acquired during the launch phase; said method further comprising the step of controlling a movable stop with a motor to slow down movement of the preformed layer while moving the movable stop in a same direction of the preformed layer as the preformed layer arrives on the layer depositing tool, the slow down of the performed layer ending in a stop at a predetermined end position.

14. The method according to claim 13, wherein the layer depositing tool used provides a target surface on which the preformed layer of objects is ready to be deposited on the pallet, the kinetic energy imparted during the launch step being sufficient for the entirety of the preformed layer of objects to arrive on the target surface.

15. The method according to claim 13, wherein the kinetic energy imparted by the conveyor to said preformed layer of objects is greater than or equal to the energy consumed during the movement of the preformed layer of objects onto the layer depositing tool.

16. The method according to claim 13, wherein the layer depositing tool used comprises a plurality of rotatable rollers, and wherein the kinetic energy imparted by the conveyor to said preformed layer of objects is greater than the kinetic energy imparted by the preformed layer of objects to the rollers.

17. The method according to claim 13, wherein the step of controlling a movable stop involves rapid deceleration of the preformed layer of objects on the layer depositing tool, during which the preformed layer of objects is decelerated at a deceleration intensity that is higher than a threshold referred to as the natural deceleration.

18. The method according to claim 13, wherein the advancement of the preformed layer of objects in the transfer direction during the transfer completion phase is solely due to the kinetic energy acquired during the launch phase.

19. A palletizer for depositing an object on a pallet, comprising:
a conveyor on which the object is initially supported and that advances the object towards a depositing tool;
the depositing tool adjacent the conveyor for receiving the object and designed to deposit the object onto the pallet;
a first motor that drives the conveyor;
a controller comprising memory, the controller configured to control the speed of the first motor, taking into account the object; so that the conveyor imparts sufficient kinetic energy to the object to complete transfer of the entire object from the conveyor to the depositing tool based on the object's inertia; and
a movable stop controlled by a second motor that resists movement of the object so as to initially slow down the movement of the object while moving the movable stop in a same direction of the object as the object arrives on the depositing tool until the object stops at a predetermined end position.

20. The palletizer according to claim 19, wherein the speed of the first motor is determined based on data stored in the memory for one or more of the following characteristics of the object: weight, dimensions, and type of base of the object in frictional contact with the conveyor.

21. A method of operating the palletizer according to claim 18, comprising the steps of controlling the speed of the first motor with the controller to advance the object in a transfer direction, from the conveyor to the depositing tool, wherein the first motor is controlled to cause the conveyor to launch the object and impart kinetic energy to the object sufficient to ensure complete transfer of the entire object from the conveyor to the depositing tool based solely on the kinetic energy acquired during the launch; and receiving the object on the depositing tool; and subsequently depositing the object onto the pallet; and wherein the step of controlling the first motor comprises an acceleration phase in which the speed of the conveyor accelerates, a cruising phase, in which the speed of the conveyor is constant, and a deceleration phase, in which the speed of the conveyor decreases, and wherein the acceleration phase starts and ends while the entire object is supported by the conveyor and the deceleration phase begins while the object is supported by the conveyor and the depositing tool.

* * * * *